(12) United States Patent
Ni et al.

(10) Patent No.: US 11,347,093 B2
(45) Date of Patent: May 31, 2022

(54) TOUCH PANEL, TOUCH CONTROL METHOD THEREOF, AND TOUCH CONTROL APPARATUS

(71) Applicants: BOE TECHNOLOGY GROUP CO., LTD., Beijing (CN); HEFEI XINSHENG OPTOELECTRONICS TECHNOLOGY CO., LTD., Hefei (CN)

(72) Inventors: Huan Ni, Beijing (CN); Xiao Guo, Beijing (CN); Qun Li, Beijing (CN); Xiaolong Xie, Beijing (CN); Xinxia Zhang, Beijing (CN); Fengzhen Lv, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 1015 days.

(21) Appl. No.: 16/064,546

(22) PCT Filed: Dec. 15, 2017

(86) PCT No.: PCT/CN2017/116500
§ 371 (c)(1),
(2) Date: Jun. 21, 2018

(87) PCT Pub. No.: WO2018/176920
PCT Pub. Date: Oct. 4, 2018

(65) Prior Publication Data
US 2021/0208438 A1 Jul. 8, 2021

(30) Foreign Application Priority Data
Mar. 31, 2017 (CN) .......................... 201710210357.6

(51) Int. Cl.
*G02F 1/1333* (2006.01)
*G02F 1/1335* (2006.01)
(Continued)

(52) U.S. Cl.
CPC .... *G02F 1/13338* (2013.01); *G02F 1/133512* (2013.01); *G02F 1/133531* (2021.01);
(Continued)

(58) Field of Classification Search
CPC ........... G02F 1/13338; G02F 1/133512; G02F 1/13312; G02F 2203/11; G06F 3/0412;
(Continued)

(56) References Cited

U.S. PATENT DOCUMENTS

2009/0146992 A1* 6/2009 Fukunaga ........... G02F 1/13338
345/214
2011/0123729 A1* 5/2011 Lee .................... G02F 1/133512
428/1.6
(Continued)

FOREIGN PATENT DOCUMENTS

CN 102830859 A 12/2012
CN 104880842 A * 9/2015 ........... G02F 1/1368

OTHER PUBLICATIONS

CN First Office Action in Application No. 201710210357.6, dated Mar. 31, 2020.
(Continued)

*Primary Examiner* — Jessica M Merlin
(74) *Attorney, Agent, or Firm* — Syncoda LLC; Feng Ma

(57) ABSTRACT

A touch panel includes a first substrate, a liquid crystal layer, a second substrate, a first optical detection layer, and a black matrix. The first optical detection layer is over a light-emitting surface of the liquid crystal layer and includes a plurality of first optical detection components, whose orthographic projections on the first substrate are within an
(Continued)

orthographic projection of the black matrix. A touch control can be determined based on a change of a first electric signal converted by each first optical detection component based on an intensity of a light transmitting through the liquid crystal layer. The light can be an infrared light. A plurality of second optical detection components can be further disposed over a light-incident surface of the liquid crystal layer to pairingly correspond to, and utilized to determine a touch control along with, the plurality of first optical detection components.

17 Claims, 11 Drawing Sheets

(51) Int. Cl.
*G06F 3/041* (2006.01)
*G06F 3/042* (2006.01)
*G02F 1/133* (2006.01)

(52) U.S. Cl.
CPC ............ *G06F 3/042* (2013.01); *G06F 3/0412* (2013.01); *G06F 3/0414* (2013.01); *G02F 1/13312* (2021.01); *G02F 2203/11* (2013.01); *G06F 2203/04106* (2013.01)

(58) Field of Classification Search
CPC .................. G06F 3/0414; G06F 3/042; G06F 2203/04106
See application file for complete search history.

(56) References Cited

U.S. PATENT DOCUMENTS

| | | |
|---|---|---|
| 2011/0267317 A1 | 11/2011 | Tsuda |
| 2012/0256881 A1* | 10/2012 | Fujioka ............... G06F 3/04184 345/175 |
| 2016/0033822 A1* | 2/2016 | Jiang ................... G02F 1/13338 349/33 |
| 2018/0348958 A1* | 12/2018 | Lee ....................... G06F 3/0421 |

OTHER PUBLICATIONS

International Search Report and Written Opinion dated Mar. 15, 2018 in PCT/CN2017/116500.
Extended European Search Report in Application No. 17877386.7, dated Feb. 23, 2021.

* cited by examiner

TOUCH PANEL, TOUCH CONTROL METHOD THEREOF, AND TOUCH CONTROL APPARATUS

CROSS-REFERENCE TO RELATED APPLICATION

The present application claims priority to Chinese Patent Application No. 201710210357.6 filed on Mar. 31, 2017, the disclosure of which is hereby incorporated by reference in its entirety.

TECHNICAL FIELD

The present disclosure relates generally to the field of display technologies, and more specifically to a touch panel, a touch control method thereof, and a touch control apparatus.

BACKGROUND

As an important human-machine interaction tool, touch panels have been utilized more and more in real life. Current touch panels have advantages such as a good operability, a nice user experience and a large display screen.

According to current touch control technologies, mainstream touch panels typically adopt capacitive touch control, resistive touch control, or infrared touch control.

However, current mainstream touch panels are typically thick, are prone to interference by electromagnetic waves from the environment, and are usually difficult to realize an accurate touch control.

SUMMARY

In view of the shortcomings in existing touch panel technologies, the present disclosure provides a touch panel, a touch control method utilizing the touch panel, and a touch control apparatus.

In a first aspect, a touch panel having a plurality of pixel units is disclosed, which comprises a first substrate, a second substrate, and a liquid crystal layer, a first optical detection layer, and a black matrix.

The first substrate and the second substrate are disposed to be opposing to each other. The liquid crystal layer is sandwiched between the first substrate and the second substrate, and comprises a plurality of liquid crystal molecules. The first optical detection layer is disposed over a light-emitting surface of the liquid crystal layer and comprises a plurality of first optical detection components. Each of the plurality of first optical detection components is configured to detect, and to convert into a first electric signal, an intensity of a light transmitting through the liquid crystal layer and shedding thereupon. The black matrix is arranged to separate neighboring pixels from one another.

The touch pane is configured such that an orthographic projection of each of the plurality of first optical detection components on the first substrate is contained within an orthographic projection of the black matrix on the first substrate.

According to some embodiments, the touch panel further includes a first polarizer and a second polarizer. The first polarizer is disposed over a light-incident surface of the first substrate, and the second polarizer is disposed between the liquid crystal layer and the first optical detection layer. Herein, a polarization direction of the first polarizer is configured to be substantially parallel or perpendicular to a polarization direction of the second polarizer.

In the embodiments of the touch panel as described above, the liquid crystal layer can include a plurality of portions positionally corresponding to the plurality of first optical detection components in a one-to-one relationship, the polarization direction of the first polarizer can be configured to be substantially perpendicular to the polarization direction of the second polarizer. It can be further configured such that an orthographic projection of each of the plurality of portions of the liquid crystal layer on the first substrate is overlapped with an orthographic projection of a corresponding first optical detection component, and each of the plurality of portions of the liquid crystal layer comprises liquid crystal molecules having a long axis thereof substantially perpendicular to the first substrate.

According to some embodiments, the touch panel further includes a second optical detection layer, which is disposed over a surface of the liquid crystal layer distal to the light-emitting surface, and comprises a plurality of second optical detection components. Each of plurality of second optical detection components is configured to detect, and to convert into a second electric signal, an intensity of a light shedding thereupon.

Herein, the plurality of second optical detection components are arranged to positionally correspond to the plurality of first optical detection components in a one-to-one relationship, and an orthographic projection of each of the plurality of second optical detection components on the first substrate is contained within the orthographic projection of the black matrix on the first substrate, and is not overlapped with an orthographic projection of a corresponding first optical detection component within a same region of the black matrix.

In the touch panel, the light can comprise an infrared light, and each of the plurality of first optical detection components can be configured to detect, and to convert into a first electric signal, an intensity of an infrared light shedding thereupon. Furthermore, in embodiments where the touch panel includes a second optical detection layer as described above, each of the plurality of second optical detection components is configured to detect, and to convert into a second electric signal, an intensity of an infrared light shedding thereupon.

In the touch panel as described above, the black matrix can have an infrared-light-blocking composition, and accordingly the first optical detection layer can be disposed between the black matrix and the liquid crystal layer.

In the touch panel as described above, the black matrix can be configured to block a visible light but to allow an infrared light to pass therethrough.

In a second aspect, the disclosure further provides a touch control apparatus. The touch control apparatus includes a touch panel according to any one of the embodiments as described above.

According to some embodiments, the touch control apparatus further includes a light source configured to provide an infrared light through a light-incident surface of the touch panel.

Optionally, the light source can comprise a first light source assembly configured to emit the infrared light, and can comprise a second light source assembly configured to emit a visible light. Optionally, the light source can include a light-emitting diode (LED), which comprises a first composition capable of emitting a visible light and a second composition capable of emitting an infrared upon excitement by the visible light.

According to some other embodiments, the touch control apparatus further includes a light source configured to emit a visible light and an infrared light-emitting layer. The infrared light-emitting layer is disposed over a light-incident surface of the second substrate in the touch panel, and is configured to allow a first portion of the visible light to pass through and to emit an infrared light upon excitement of a second portion of the visible light shedding thereinto.

According to yet some other embodiments, the touch control apparatus further includes a light source configured to emit a visible light and an infrared light-emitting layer. The infrared light-emitting layer is disposed over a light-incident surface of the second substrate in the touch panel, and comprises a plurality of infrared light-emitting portions. Each of the plurality of infrared light-emitting portions is arranged to have an orthographic projection thereof on the first substrate overlap with an orthographic projection of a corresponding first optical detection component on the first substrate, and is configured to allow a first portion of the visible light to pass through and to emit an infrared light upon excitement of a second portion of the visible light shedding thereinto.

According to some embodiments, the touch control apparatus further includes a plurality of detection circuits. Each of the plurality of first optical detection components is coupled, and corresponds, to one of the plurality of detection circuits, and each of the plurality of detection circuits is configured to receive the first electric signal from a corresponding first optical detection component, to determine, based on a change of the first electric signal, whether an external force is applied to a position of the touch panel corresponding to the each of the plurality of detection circuits, and then to output the position if so.

The touch control apparatus can further include a central touch control detection circuit, which is coupled to each of the plurality of detection circuits and is configured to map locations of the touch based on the position received from the each of the plurality of detection circuits.

According to some embodiments of the touch control apparatus, the touch panel further comprises a second optical detection layer, which is disposed over a surface of the liquid crystal layer distal to the light-emitting surface. The second optical detection layer comprises a plurality of second optical detection components, wherein each second optical detection component is configured to detect, and to convert into a second electric signal, an intensity of a light shedding thereupon, and is coupled, and corresponds, to one of the plurality of detection circuits. The plurality of second optical detection components are arranged to positionally correspond to the plurality of first optical detection components in a one-to-one relationship.

Herein, each of the plurality of detection circuits is further configured to receive the second electric signal from a corresponding second optical detection component, to determine, based on a change in a difference between the first electrical signal and the second electrical signal, whether an external force is applied to a position of the touch panel corresponding to the each of the plurality of detection circuits, and to output the position if so.

In a third aspect, the disclosure further provides a touch control method utilizing the touch panel according to any one of the embodiments as described above.

The touch control method comprises:
detecting a first electric signal from each of the plurality of first optical detection components; and
determining whether an external force is applied to a position of the touch panel corresponding to the each of the plurality of first optical detection components based on the first electric signal, and outputting the position if so.

According to some embodiments of the touch control method, the detecting a first electric signal from each of the plurality of first optical detection components comprises:
each of the plurality of first optical detection components detecting, and converting into the first electric signal, an infrared light.

Furthermore, in the touch control method, the determining whether an external force is applied to a position of the touch panel corresponding to the each of the plurality of first optical detection components based on the first electric signal, and outputting the position if so can comprise:
determining that an external force is applied to a position of the touch panel corresponding to the each of the plurality of first optical detection components if a change of the first electric signal is larger than a first threshold value.

According to some embodiments of the touch control method, the touch panel further comprises a second optical detection layer as described above. As such, the detecting a first electric signal from each of the plurality of first optical detection components can comprise:
simultaneously detecting the first electric signal from each of the plurality of first optical detection components and a second electric signal from a corresponding second optical detection component;

The determining whether an external force is applied to a position of the touch panel corresponding to the each of the plurality of first optical detection components based on the first electric signal, and outputting the position if so can comprise:
determining that an external force is applied to a position of the touch panel corresponding to the each of the plurality of detection circuits, and outputting the position if a change in a difference between the first electrical signal and the second electrical signal is larger than a second threshold value.

The touch panel and the display apparatus contain the touch panel as described above has the following beneficial effects:

The present disclosure provides a touch panel and a display apparatus, the touch panel comprises the first polarizer, the first substrate, the liquid crystal layer, the second substrate and the second polarizer configured in the direction of light transmission, through the configuration of the control circuit and the optoelectronic detection assemblies, the control circuit is connected to the optoelectronic detection assemblies, the optoelectronic detection assemblies are at least partially configured at the side of the second polarizer that is away from the second substrate.

When external force is applied to the surface of the touch panel, the portion of the liquid crystal layer corresponding to the touch locations is squeezed, the optical rotatory power of the liquid crystal molecules in the liquid crystal layer is changed, as a result, the intensity of the light emitted from the second polarizer at the touch locations is changed, the optoelectronic detection assemblies can convert the light intensity signals emitted from the second polarizer into electric signals, therefore, the control circuit can determine the touch locations according to the changes in the electric signals of the optoelectronic detection assemblies.

The touch panel provided by the present disclosure determines touch locations according to the changes in the intensity of the light detected by the optoelectronic detection assemblies, the change of light intensity is not easily influenced by electromagnetic waves in the environment, therefore, compared with capacitive touch panel and resistive touch panel, the accuracy of determining the touch locations is higher, in addition, compared with infrared touch panel, there is no need to configure infrared emitters and infrared detectors at the outer edge of the touch panel, the thickness of the touch panel is reduced, the thinness and lightness of the touch panel is improved.

Other embodiments may become apparent in view of the following descriptions and the attached drawings.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based on these drawings.

DETAILED DESCRIPTION

Applicants of this present disclosure have observed the following technical issues associated with conventional touch panel technologies.

As for capacitive touch panels and resistive touch panels, touch locations are detected through changes in capacitance or electric potential. However, the changes in capacitance or electric potential can be easily interfered by electromagnetic waves in the environment and are thus not so stable. Consequently, the accuracy of the determination of the touch locations can be negatively influenced.

Infrared touch panels are based on optics. A net of infrared rays is typically configured over the surface of a touch panel, and touch locations are detected through changes in the strength of infrared rays. However, in order to configure the net of infrared rays over the surface of the touch panel, infrared transmitters and infrared detectors need to be arranged at the outer edge of the touch panel. Consequently, the touch panel has an increased thickness, which negatively influences the thinness and lightness of the touch panel, and it is often difficult to realize a multiple-point touch control.

In order to address the technical issues as mentioned above, the present disclosure provides a touch panel and a display apparatus.

In the following, with reference to the drawings of various embodiments disclosed herein, the technical solutions of the embodiments of the disclosure will be described in a clear and fully understandable way.

It is obvious that the described embodiments are merely a portion but not all of the embodiments of the disclosure. Based on the described embodiments of the disclosure, those ordinarily skilled in the art can obtain other embodiment(s), which come(s) within the scope sought for protection by the disclosure.

In a first aspect, a touch panel is disclosed herein.

Figure 1:
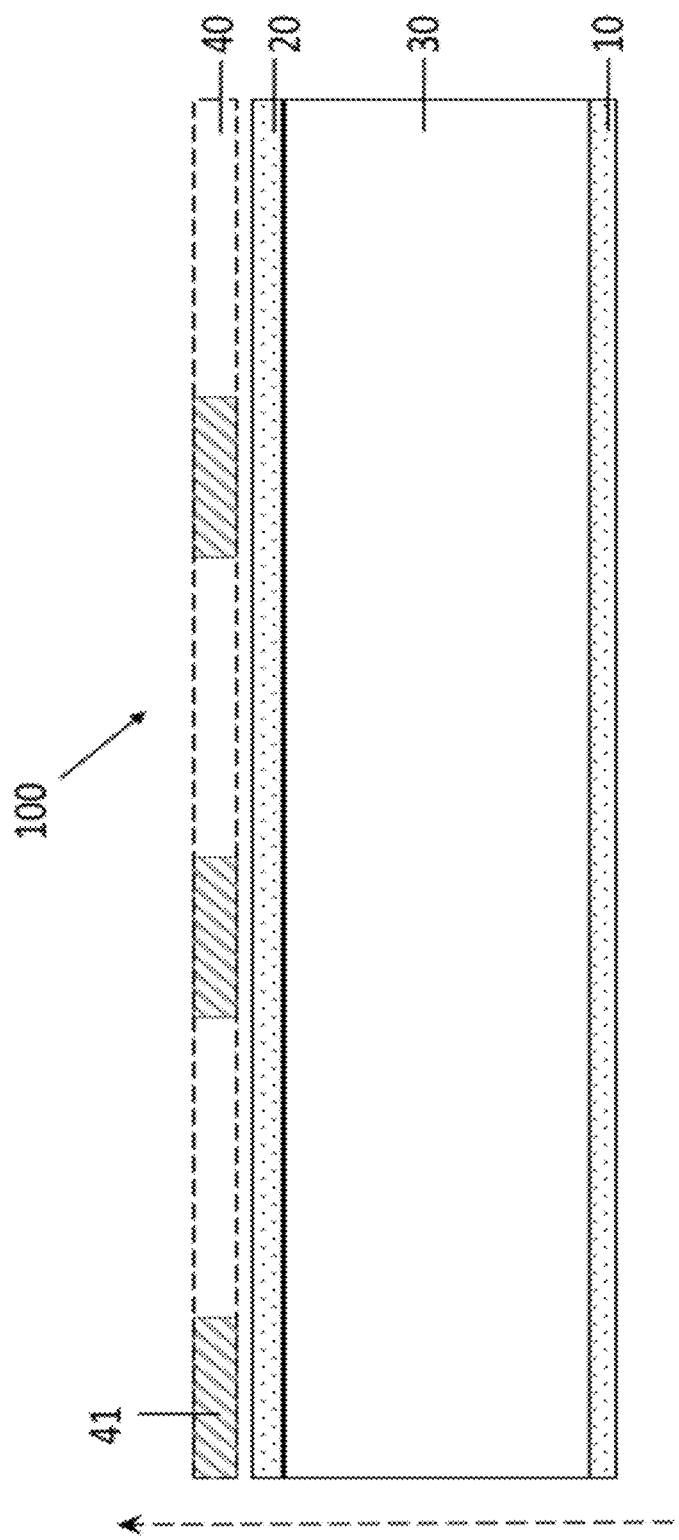
FIG. 1 illustrates a schematic structure of a touch panel according to a first embodiment of the touch panel.

FIG. 1 illustrates a touch panel according to some embodiments of the present disclosure. As shown in FIG. 1, the touch panel 100 comprises a first substrate 10 and a second substrate 20, which are disposed to oppose to each other in the touch panel 100. The display panel further comprises a liquid crystal layer 30, which is sandwiched between the first substrate 10 and the second substrate 10. The liquid crystal layer 30 contains a plurality of liquid crystal molecules (not shown in the figure).

The touch panel 100 further comprises a first optical detection layer 40, which is disposed over a light-emitting surface of the liquid crystal layer 30, more specifically over a light-emitting surface of the second substrate 20. The first optical detection layer 40 comprises a plurality of first optical detection components 41. Herein it is noted that the direction of light transmission in the touch panel 100 is shown as a dotted arrow, as shown in FIG. 1.

In the touch panel disclosed herein, each of the plurality of first optical detection components 41 is configured to detect, and to convert into a first electric signal, an intensity of a light transmitting through the liquid crystal layer and shedding thereupon.

Figure 2A:
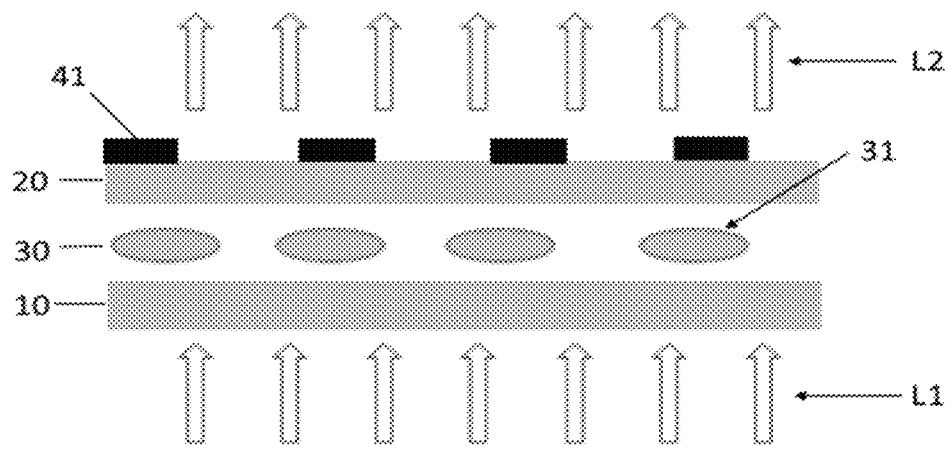
FIG. 2A and FIG. 2B illustrate the working principle of touch control detection using the touch panel as shown in FIG. 1.
Figure 2B:
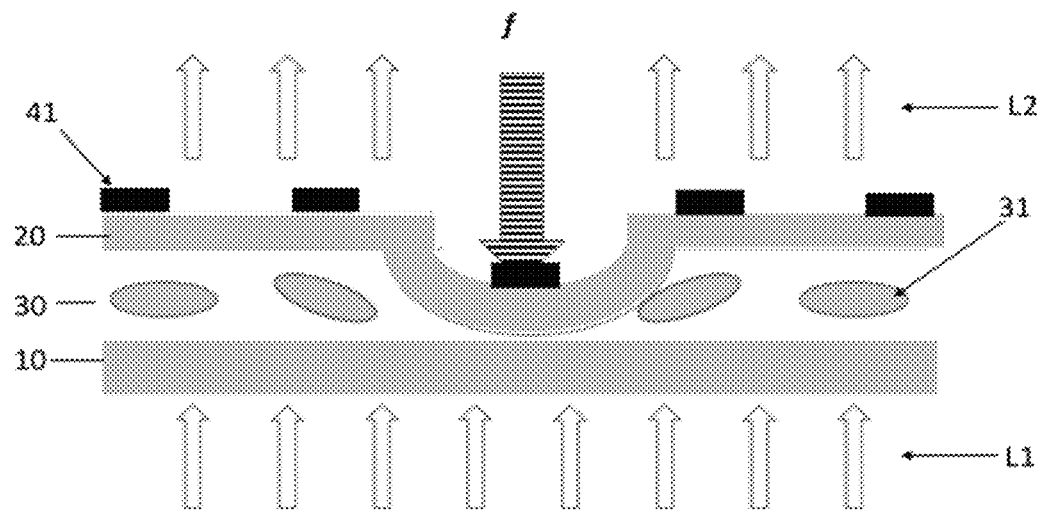

The touch panel 100 as described above can realize the detection of a touch on the touch panel 100, as illustrated in FIG. 2A and FIG. 2B.

Specifically, lights (i.e. incident lights L1) enter into the touch panel 100 from a light-incident surface of the touch panel 100, transmit through the first substrate 10, the liquid crystal layer 30, and the second substrate 20 to emit out (as existing lights L2). At each location of the touch panel 100, each of the plurality of first optical detection components 41 can detect an intensity of the light L2 and convert the intensity of the light L2 into a first electric signal.

As shown in FIG. 2A, in an absence of an external force onto the touch panel 100, the first electric signal detected by each first optical detection component 41, which corresponds to each location of the touch panel 100, remains substantially unchanged over time.

As illustrated in FIG. 2B, if an external force f (shown as the arrow) is applied to a location on a surface of the touch panel 100 (i.e. the surface of the touch panel 100 is touched at a position of touch), a portion of the liquid crystal layer 30 at the location of the surface of the touch panel 100 is squeezed, altering alignments of the liquid crystal molecules 31 in the portion of the liquid crystal layer 30. The change of the alignment of the liquid crystal molecules 31 can in turn alter the intensity of the light emitted out (i.e. L2) at the position of touch.

As such, by detecting whether there is a change of the first electrical signal, which corresponds to the change of intensity of the existing light (L2) at each location of the surface of the touch panel 100, it can be determined whether an external force is applied to any location of the surface of the touch panel 100, and if so, the exact position of the surface of the touch panel 100 where the external force is applied can be determined, thereby realizing the touch control functionality for the touch panel 100.

Herein, the criteria for determining whether a touch control occurs can be as follows: if a change of the first electric signal is smaller than, or equal to, the first threshold value, no external force is applied; yet if a change of the first electric signal is larger than a first threshold value, a touch control is detected, and the corresponding location can be outputted as the location of touch control.

Herein, the first threshold value can be set differently based on practical needs, such as the different requirements for touch control sensitivity. For example, if a higher sensitivity is wanted, a relatively smaller first threshold value can be applied for the touch control detection on the touch panel. If a lower sensitivity is wanted, a relatively larger first threshold value can be applied for the touch control detection on the touch panel.

Herein, the light can comprise an infrared light, and correspondingly, each of the plurality of first optical detection components 41 in the first optical detection layer 40 can be configured to detect, and to convert into a first electric signal, an intensity of an infrared light transmitting through the liquid crystal layer and shedding thereupon.

It is noted that besides an infrared light, other type of lights such as a visible light, or an ultraviolet light, etc., are also possible, and can be detected by each of the plurality of first optical detection components 41 in the first optical detection layer 40.

It is further noted that all the embodiments covered in the disclosure utilize an infrared light for the touch control detection, yet these embodiments shall be construed as illustrating examples only, and do not impose limitations to the scope of the disclosure.

Herein the first electric signal can be a current signal or a voltage signal. If the first electric signal is a current signal, each of the plurality of first optical detection components 41 in the first optical detection layer 40 can convert an intensity of the light (i.e. light intensity signal) into a current signal. Alternatively, if the first electric signal is a voltage signal, each of the plurality of first optical detection components 41 in the first optical detection layer 40 can convert an intensity of the light (i.e. light intensity signal) into a voltage signal.

It should be noted that possibly the plurality of first optical detection components 41 in the first optical detection layer 40 can be employed to mixedly obtain current signals and voltage signals in the touch panel 100. That is, a first subset of first optical detection components 41 can be employed to convert light intensity signals into current signals, whereas a second subset of first optical detection components 41 can be employed to convert light intensity signals into voltage signals. The mixed current signals and voltage signals can be utilized for the touch panel 100 to independently determine whether an external force is applied to a particular location of the surface of the touch panel 100.

According to some embodiments of the disclosure, each of the plurality of first optical detection components 41 in the first optical detection layer 40 can be a photosensitive resistor (i.e. photoresistor), configured to detect, and to convert into a first current signal, an intensity of a light transmitting through the liquid crystal layer and shedding thereupon. Typically, the stronger an intensity of the light received by a first optical detection component 41, the stronger the first current signal generated thereby.

Figure 3:
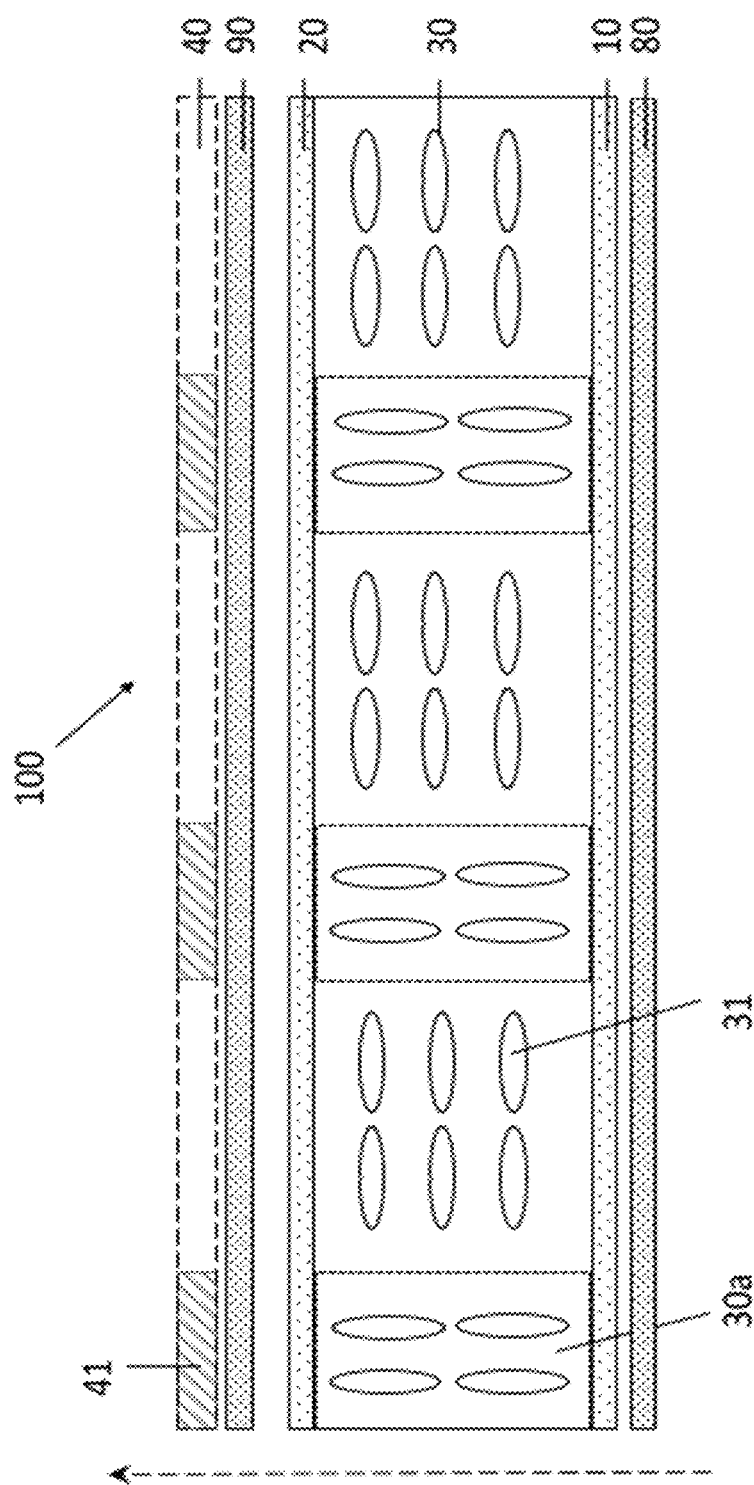
FIG. 3 illustrates a touch panel according to some other embodiments of the disclosure.

According to some embodiments, the touch panel 100 can be further configured such that the liquid crystal molecules at portions 30a of the liquid crystal layer 30 that correspond to the plurality of first optical detection components 41 in the first optical detection layer 40 have an alignment direction thereof substantially parallel or substantially perpendicular to a plane of the first substrate 10. FIG. 3 illustrates one embodiment of the touch panel 100 having liquid crystal molecules at portions of the liquid crystal layer 30 corresponding to the plurality of first optical detection components 41 have an alignment direction thereof substantially perpendicular to a plane of the first substrate 10.

Herein, a portion 30a of the liquid crystal layer 30 is defined as corresponding to the plurality of first optical detection components 41 in the first optical detection layer 40 if an orthographic projection thereof on the first substrate 10 overlaps with the orthographic projection of a first optical detection component 41 on the first substrate 10. The alignment direction of the liquid crystal molecules is defined as substantially a long axis of the liquid crystal molecules.

In order to further increase the sensitivity of touch control detection, the touch panel 100 can be further provided with, along a direction of light transmission, a first polarizer 80 and a second polarizer 90, also as shown in FIG. 3.

The first polarizer 80 is disposed over a light-incident surface of the first substrate 10, and the second polarizer 90 is disposed between the second substrate 20 and the first optical detection layer 40. It is configured such that a polarization direction of the first polarizer 80 is substantially perpendicular, or substantially parallel, to a polarization direction of the second polarizer 90.

In one embodiment of the touch panel 100 as shown in FIG. 3, the first polarizer 80 and the second polarizer 90 can be configured to have a substantially perpendicular polarization direction.

Additionally, a long axis of each of the liquid crystal molecules 31 in the liquid crystal layer 30 positionally corresponding to each first optical detection component 41 can be configured to be substantially perpendicular to a plane of the first substrate 10. That is, the liquid crystal molecules 31 in the liquid crystal layer 30 positionally corresponding to the plurality of first optical detection component 41 (as shown by the box with dotted lines in FIG. 3) are configured to comprise vertically aligned liquid crystal molecules.

In the absence of an external force, the liquid crystal molecules to positionally corresponding to each first optical detection component 41 are unable to change a polarization direction of the light transmitting therethrough. Due to the substantially perpendicular polarization directions of the first polarizer 80 and the second polarizer 90 in the touch panel 100, the polarized light emitting through the first polarizer 80 cannot emit through the second polarizer 90 to reach a first optical detection component 41 corresponding thereto, and no current signals are thus generated by the first optical detection component 41.

In the presence of an external force applied to the surface of the touch panel 100, an alignment direction of the liquid crystal molecules positionally corresponding to each first optical detection component 41 changes under the external force. The liquid crystal molecules whose alignment direction is changed can in turn alter the polarization direction of the polarized light emitting through the first polarizer 80 and into the liquid crystal layer 30 before reaching the second polarizer 90. Consequently, a portion of light can emit through the second polarizer 90 to reach the first optical detection component 41 corresponding to the position of the external force (i.e. the position of touch), and a current signal can be generated by the first optical detection component 41. As such, the position of touch based on whether a current signal can be detected can be determined.

It should be noted that each of the first substrate 10 and the second substrate 20 can be configured to comprise at least one vertical alignment region that positionally corresponds to each of the plurality of first optical detection components 41 (not shown in the drawings).

It should be noted that according to some other embodiments of the touch panel 100, the first polarizer 80 and the second polarizer 90 can be configured to have a substantially parallel polarization direction relative to each other.

As such, in the absence of an external force, due to the substantially parallel polarization directions of the first polarizer 80 and the second polarizer 90 in the touch panel 100, the polarized light emitting through the first polarizer 80 can emit through the second polarizer 90 to reach a first optical detection component 41 corresponding thereto, and thus, the light reaching the first optical detection component 41 has a strongest intensity, and in turn the current signal generated by the first optical detection component 41 is strongest.

In the presence of an external force applied to the surface of the touch panel 100, an alignment direction of the liquid crystal molecules positionally corresponding to the first optical detection component 41 changes under the external force. The liquid crystal molecules whose alignment direction is changed can in turn alter the polarization direction of the light transmitting therethrough. Consequently, a portion of light cannot emit out through the second polarizer 90 to reach the corresponding first optical detection component 41, thus the intensity of the light reaching the corresponding first optical detection component 41 is weakened, and in turn, the current signals detected by the corresponding first detection circuits 10 become weaker.

By detecting the decrease of the current signal measured by each of the plurality of first optical detection components 41, the touch panel 100 can thus realize a touch control detection.

The touch panel 100 as described above can further include a plurality of pixel units, and a black matrix can be arranged in the touch panel 100 to separate neighboring pixels from one another. It is configured such that an orthographic projection of each of the plurality of first optical detection components on the first substrate is contained within an orthographic projection of the black matrix on the first substrate.

Figure 4A:
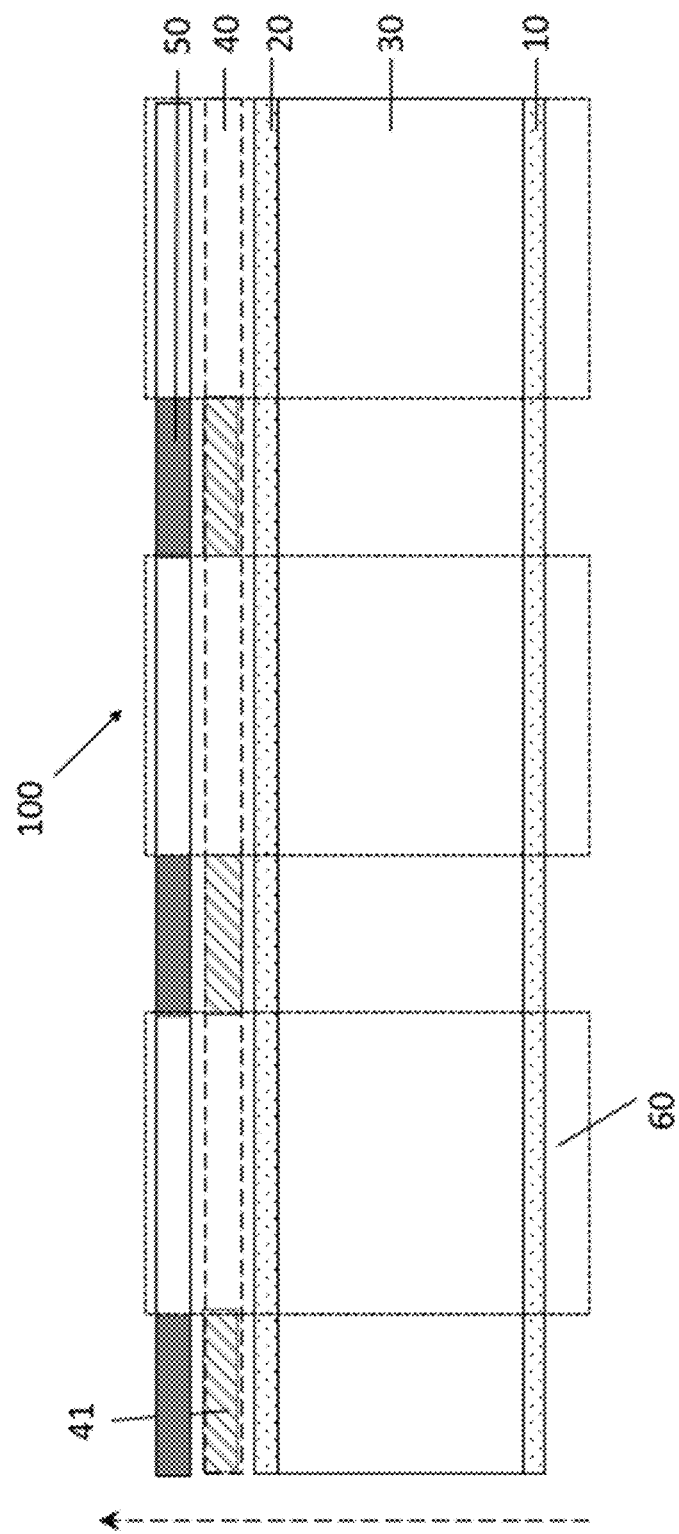
FIG. 4A and FIG. 4B respectively illustrate two embodiments of the touch panel based on the different relative positions of the black matrix and the first optical detection layer 40.
Figure 4B:
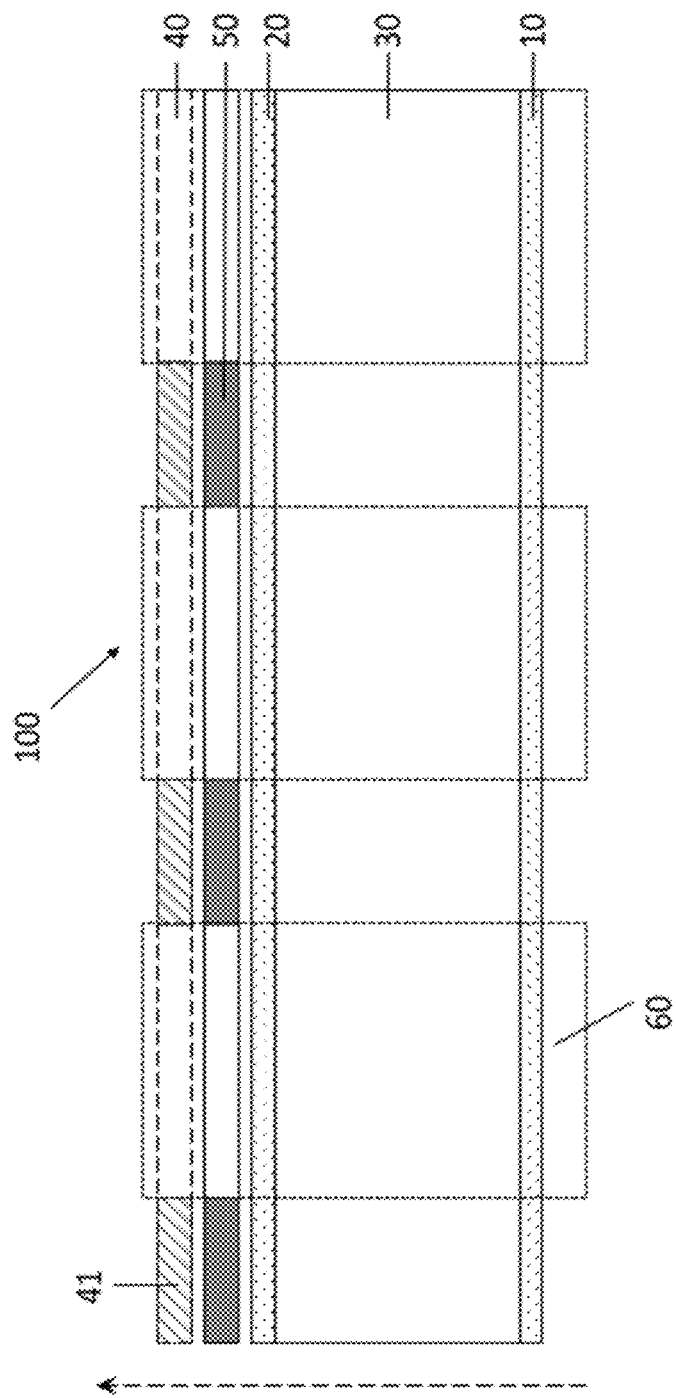

FIG. 4A and FIG. 4B respectively illustrate two embodiments of the touch panel 100 depending on the relative positions of the black matrix and the first optical detection layer 40.

As shown in the two figures, the touch panel 100 further comprise a plurality of pixel units 60, which are defined by a pattern of black matrix 50, and it is configured such that an orthographic projection of each of the plurality of first optical detection components 41 on the first substrate 10 is contained within an orthographic projection of the black matrix 50 on the first substrate 10.

In the touch panel 100 as described above, the black matrix 50 can have different positions relative to the first optical detection layer 40, which can depend on the composition of the black matrix 50.

In the touch panel 100, if the black matrix 50 has a composition that can block a visible light but can also substantially block the infrared light (i.e. the infrared light cannot transmit through the black matrix 50), the black matrix 50 needs to be disposed over a surface of the first optical detection layer 40 distal to the second substrate 20 (i.e. a light-emitting surface of the first optical detection layer 40), as illustrated in FIG. 4A.

In the touch panel 100, if the black matrix 50 has a composition that can block a visible light but still allows an infrared light to transmit therethrough, there is no specific requirement for the position of the black matrix 50 relative to the first optical detection layer 40. In addition to FIG. 4A, the black matrix 50 can also take a relative position as illustrated in FIG. 4B, where the black matrix 50 is disposed over a surface of the first optical detection layer 40 proximal to the second substrate 20 (e.g. between the first optical detection layer 40 and the second substrate 20). Herein, the black matrix 50 can be a visible light blocking filter, or comprise a visible light blocking dye, or has a composition of a black resin.

By the configuration of pixel units, black matrix, and the each of the plurality of first optical detection components as described above, the touch panel 100 can allow a display of images by means of the plurality of pixel units 60, which utilize visible lights for image displaying, and simultaneously allow an independent touch control detection by means of the plurality of first optical detection components 41, which substantially utilize infrared lights for the touch control detection.

Furthermore, because the plurality of first optical detection components 41 in the first optical detection layer 40 are substantially disposed in regions between neighboring pixel units of the touch panel 100 without occupying additional regions in the display area, thereby the aperture ratio of the touch panel 100 can be maximized.

In addition to the embodiments of the touch panel 100 as described above, where the touch control detection is realized by means of the first optical detection layer 40, where each first optical detection component 41 substantially detects a location of an external force (i.e. the touch) by detecting the change of the first electric signal which corresponds to the change of an infrared light intensity due to the touch-induced alteration of the alignment of liquid crystal molecules at the location of touch, the touch control detection can also be realized by means of two optical detection layers 40.

Figure 5A:
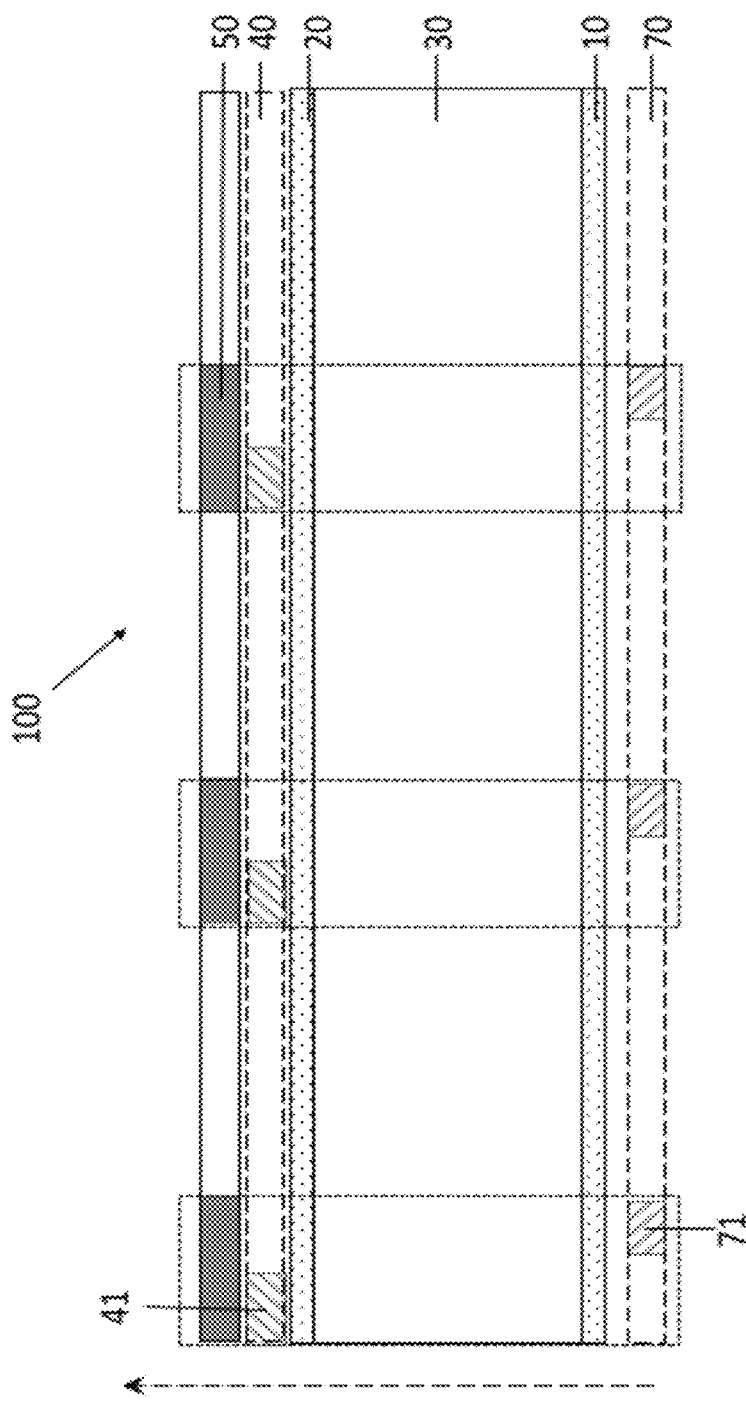
FIG. 5A and FIG. 5B illustrate a touch panel having two optical detection layers according to two embodiments of the disclosure.
Figure 5B:
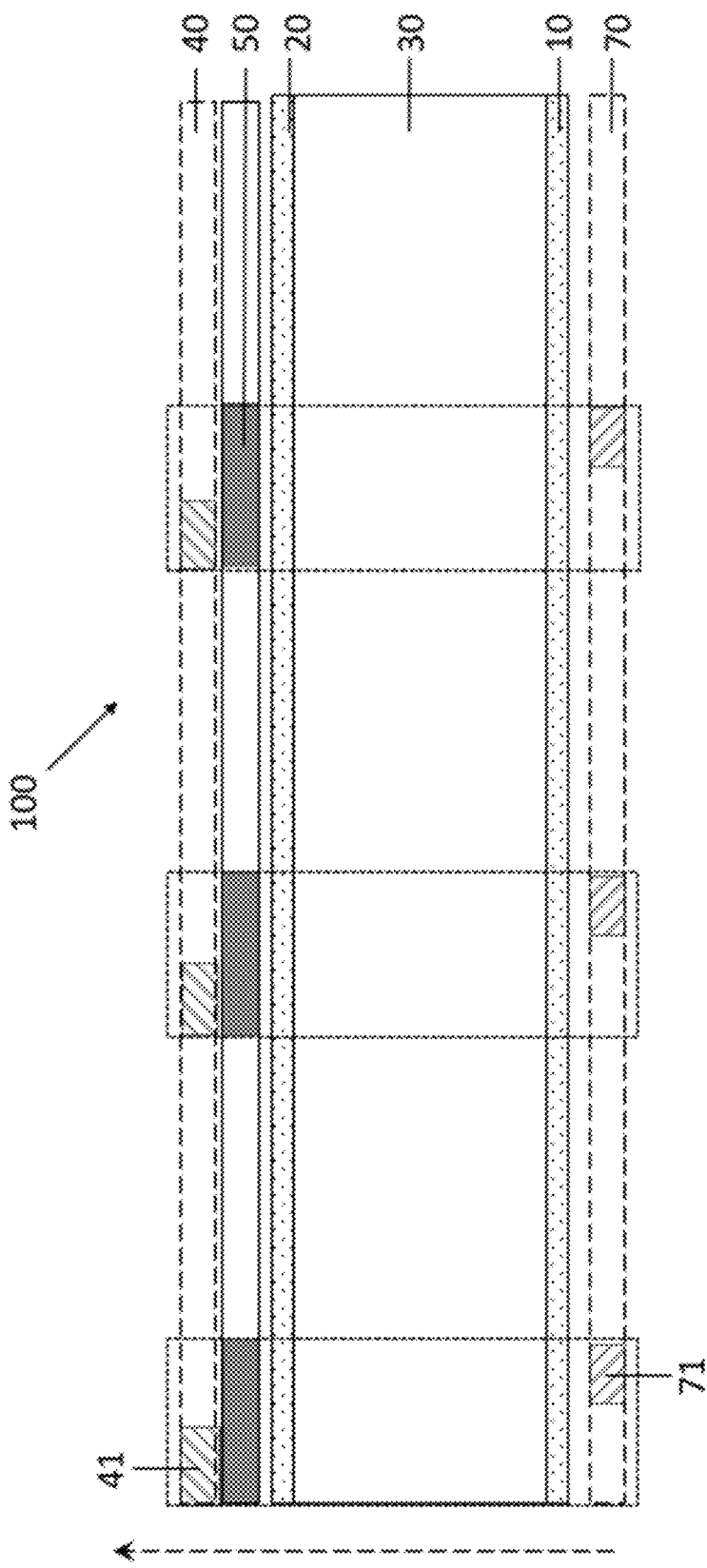

FIG. 5A and FIG. 5B illustrate such a touch panel 100 according to two different embodiments of the disclosure. As shown in the two figures, in addition to the first optical detection layer 40, the touch panel 100 further comprises a second optical detection layer 70, which is disposed over a surface of the liquid crystal layer 30 distal to the light-emitting surface thereof (i.e. over the light-incident surface of the liquid crystal layer 30).

Like the first optical detection layer 40, the second optical detection layer 70 comprises a plurality of second optical detection components 71, configured such that the plurality of second optical detection components 71 are arranged to positionally correspond to the plurality of first optical detection components 41 in a one-to-one relationship. Each of the plurality of second optical detection components 71 in the second optical detection layer 70 is configured to detect, and to convert into a second electric signal, an intensity of a light shedding thereupon.

Herein, similar to the embodiments as mentioned above and illustrated in FIGS. 4A and 4B, the black matrix 50 can be disposed over a surface of the first optical detection layer 40 distal to the second substrate 20, as illustrated in FIG. 5A, or can be disposed over between the first optical detection layer 40 and the second substrate 20, as illustrated in FIG. 5B.

Further as illustrated by the boxes with dotted line in FIGS. 5A and 5B, it can be configured such that an orthographic projection of each of the plurality of first optical detection components 41 on the first substrate 10 and an orthographic projection of each of the plurality of second optical detection components 71 on the first substrate 10 are contained within an orthographic projection of the black matrix 50 on the first substrate 10.

Furthermore, because an optical detection component (i.e. a first optical detection component 41 or a second optical detection component 71) is typically not transparent to any light, the orthographic projection of each of the plurality of second optical detection components 71 on the first substrate 10 is configured not to be overlapped with an orthographic projection of a corresponding first optical detection component 41 within a same region of the black matrix 50, as illustrated by the boxes with dotted line in FIGS. 5A and 5B.

The touch panel 100 as illustrated in FIGS. 5A and 5B can utilize pairingly disposed first optical detection components 41 in the first optical detection layer 40 and the second optical detection components 71 in the second optical detection layer 70 (i.e. a pair of a first optical detection components 41 and a second optical detection components 71 that positionally and functionally corresponds to the first optical detection components 41) for the detection of touch control on the touch panel 100.

Specifically, the touch panel 100 can simultaneously detect the first electric signal from each of the plurality of first optical detection components 41 and a second electric signal from a corresponding second optical detection component 71.

Then based on a change in a difference between the first electrical signal and the second electrical signal, the touch panel 100 can determine whether an external force is applied to a position of the touch panel 100.

If a change in the difference between the first electrical signal and the second electrical signal is detected (i.e. the change in the difference between the first electrical signal and the second electrical signal is larger than a second threshold value), the touch panel 100 can output the position of the external force to thereby realize the touch control detection.

Herein, the second threshold value can be set differently based on practical needs, such as the different requirements for touch control sensitivity. For example, if a higher sensitivity is wanted, a relatively smaller second threshold value can be applied for the touch control detection by the touch panel 100. If a lower sensitivity is wanted, a relatively larger second threshold value can be applied for the touch control detection by the touch panel 100.

By the above configurations, the touch panel 100 can allow a display of images by means of the plurality of pixel units 60, which utilize visible lights for image displaying, and simultaneously can allow an independent touch control detection by means of the plurality of first optical detection components 41 in the first optical detection layer 40 and of the plurality of second optical detection components 71 in the second optical detection layer 70, which substantially utilize infrared lights for the touch control detection.

Furthermore, because the plurality of first optical detection components 41 in the first optical detection layer 40 and the plurality of second optical detection components 71 in the second optical detection layer 70 are substantially disposed in regions between neighboring pixel units of the touch panel 100 without occupying additional regions in the display area, thereby the aperture ratio of the touch panel 100 can be maximized.

In addition, in this embodiment of the touch panel 100 as illustrated in FIGS. 5A and 5B, because the touch control detection is realized by simultaneous measuring of a first electric signal from each of the plurality of first optical detection components 41 and a second electric signal from a corresponding second optical detection component 71, changes in electric signals that are caused by changes in the intensity of the light incident into the touch panel 100, such as that emitted from a backlight assembly, can thus be controlled. As a consequence, a higher accuracy for determining positions of touch can be realized.

In a second aspect, the present disclosure further provides a touch control apparatus, which comprises a touch panel according to any one of the embodiments as described above.

According to some embodiments, the touch control apparatus further comprises a light source, which is disposed over a light-incident surface of the touch panel 100 (i.e. over the surface of the first substrate 10 opposing the liquid crystal layer 30), and is configured to provide an infrared light.

In some embodiments of the touch control apparatus which also have a functionality of a display apparatus (i.e. the touch panel 100 in the touch control apparatus include pixel units), the light source can be configured to also provide a visible light.

As such, according to a first embodiment of the touch control apparatus, the light source can include a first light source assembly and a second light source assembly. The first light source assembly is configured to emit an infrared light, and the second light source assembly configured to emit a visible light. Herein the first light source assembly can comprise infrared light-emitting diodes according to some specific embodiments.

According to a second embodiment of the touch control apparatus, the light source can comprise a light-emitting diode (LED), which has a first composition capable of emitting a visible light, and a second composition capable of emitting an infrared upon excitement by the visible light. Herein the first composition is known to people of ordinary skills in the field and its description is skipped herein.

The light source as illustrated in the first embodiment and the second embodiment of the touch control apparatus can be disposed in a backlight assembly of the touch control apparatus.

Figure 6A:
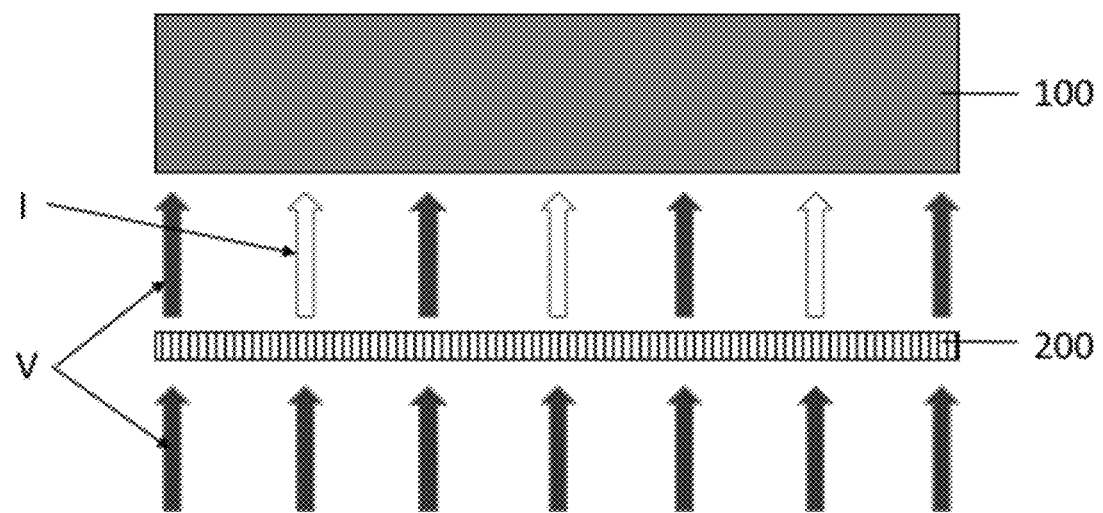
FIG. 6A and FIG. 6B illustrate an infrared light-emitting layer included in a touch control apparatus according to two different embodiments of the present disclosure.

According to some other embodiments, the touch control apparatus includes a light source that emits only visible lights, and the touch control apparatus can further comprise an infrared light-emitting layer 200, disposed between the light source and the touch panel 100 (more specifically, over a light-incident surface of the second substrate 10 in the touch panel 100), as illustrated in FIG. 6A. The infrared light-emitting layer 200 is configured to allow a first portion of the visible light to pass through, yet also to emit an infrared light upon excitement of a second portion of the visible light. As such, the infrared light-emitting layer 200 can be a resin having a composition which, upon excitement of a visible light, emits an infrared light. Other composition is also possible.

The infrared light-emitting layer 200 can be configured to have a pattern that corresponds to the plurality of first optical detection components 41 in the first optical detection components in the embodiment of the touch panel 100 as illustrated in FIG. 1.

Figure 6B:
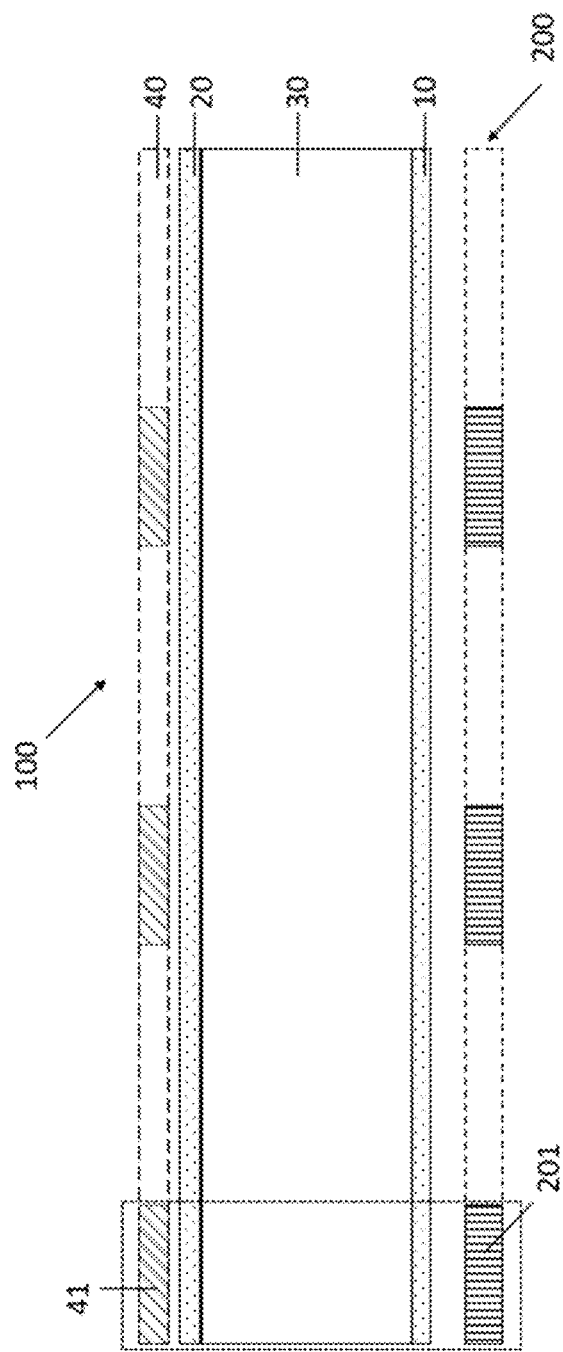

As illustrated in FIG. 6B, the infrared light-emitting layer 200 comprises a plurality of infrared light-emitting portions 201. Each of the plurality of infrared light-emitting portions 201 is arranged such that an orthographic projection thereof on the first substrate 10 overlaps with an orthographic projection of a corresponding first optical detection component 41 on the first substrate 10.

In embodiments of the touch control apparatus where the touch panel contains a black matrix 50 (as illustrated in FIGS. 4A, 4B, 5A, and 5B), the infrared light-emitting layer 200 can have a pattern such that an orthographic projection thereof on the first substrate 10 overlaps with an orthographic projection of the pattern of black matrix 50 on the first substrate 10 (not show in the drawings).

It is noted that by configuring a patterned infrared light-emitting layer 200 which corresponds to the optical detection components in the touch panel, the loss of visible light which comes from the light source and transmits through the infrared light-emitting layer 200 can be effectively avoided.

The touch control apparatus can further include an optical detection assembly, which specifically detects whether there is a touch on the touch panel, and if so, calculates the position of touch.

Figure 7A:
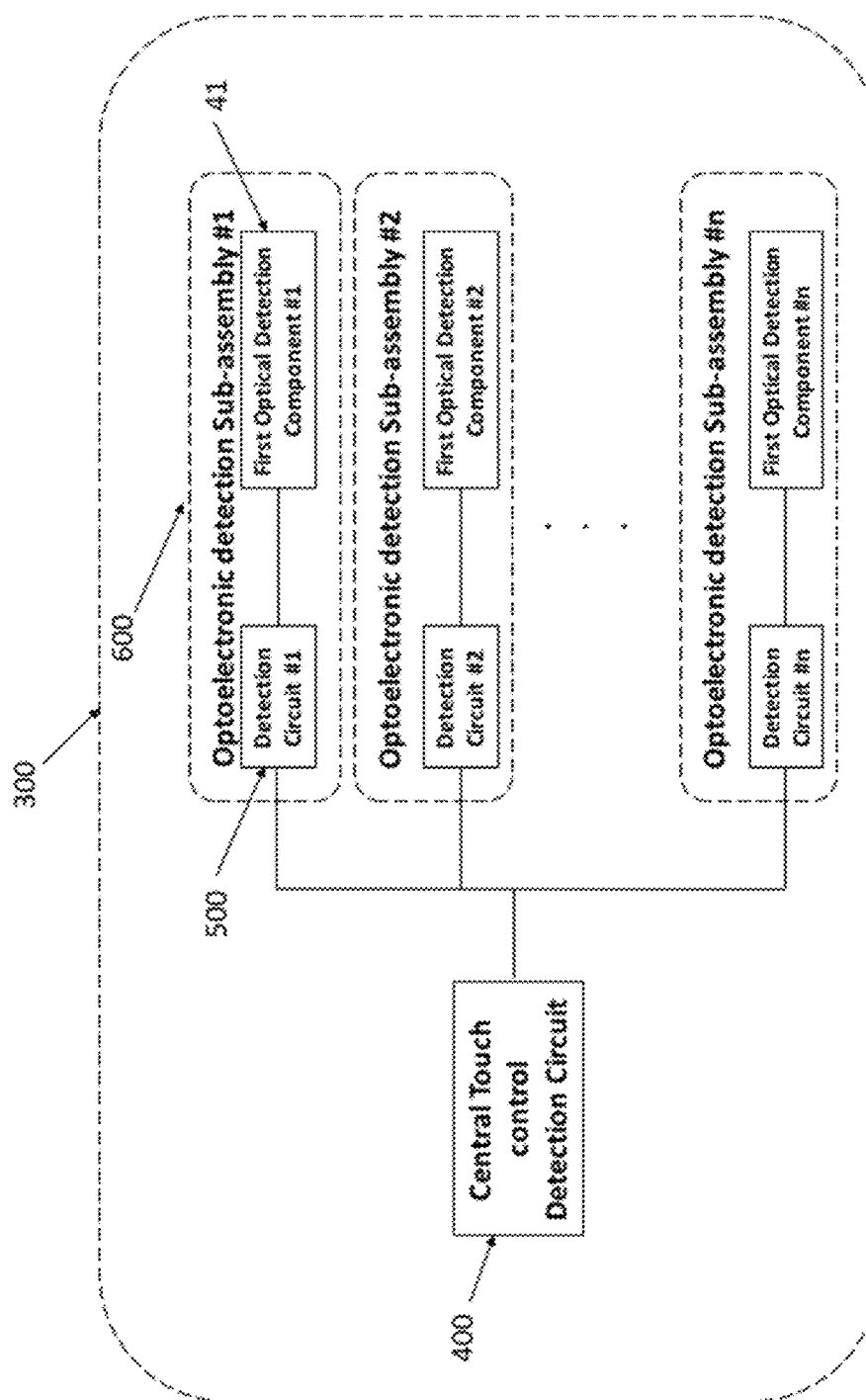
FIG. 7A and FIG. 7B illustrate an optical detection assembly in a touch control apparatus according to two different embodiments of the present disclosure.
Figure 7B:
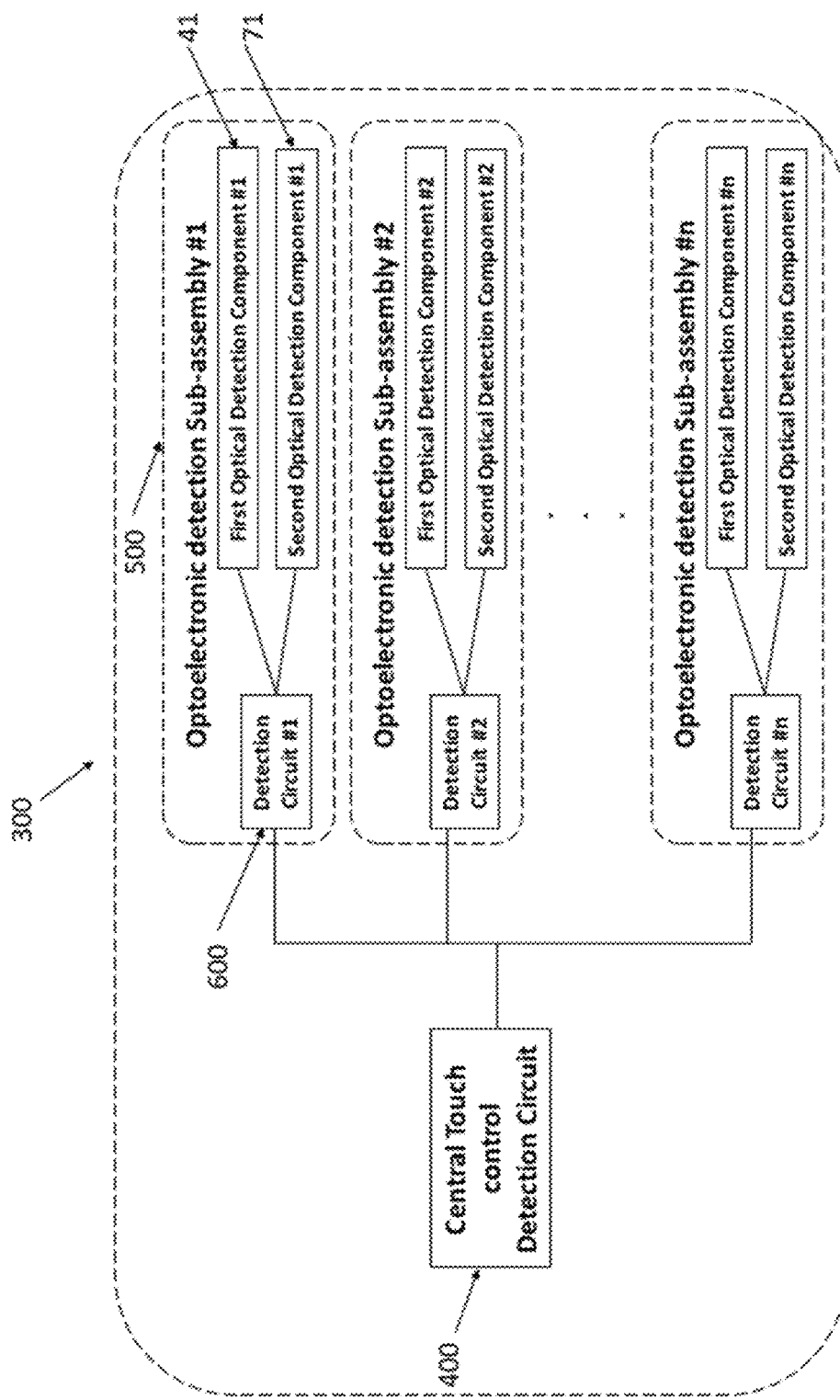

Specifically, as illustrated in FIG. 7A and FIG. 7B, the optical detection assembly 300 includes a central touch control detection circuit 400 and a plurality of optoelectronic detection sub-assemblies 500. Each of the plurality of optoelectronic detection sub-assemblies 500 comprises a detection circuit 600 and one or two optical detection components.

As illustrated in FIG. 7A, in embodiments of the touch control apparatus where the touch panel 100 contains only the first optical detection layer 40 (as illustrated in FIG. 1, FIG. 3, FIG. 4A, or FIG. 4B), each of the plurality of optoelectronic detection sub-assemblies 500 comprises one of the plurality of first optical detection components 41 and a detection circuit 600 that is coupled, and thereby corresponds, to the one of the plurality of first optical detection components 41.

As such, in each of the plurality of optoelectronic detection sub-assemblies 500, the detection circuit 600 is configured to receive a first electric signal from a corresponding first optical detection component 41, to determine, based on a change of the first electric signal (more specifically, based on whether the change of the first electric signal is larger than or small than a first threshold), whether an external force is applied to a position of the touch panel corresponding to the each of the plurality of optoelectronic detection sub-assemblies 500, and then to output the position information to the central touch control detection circuit 400. The central touch control detection circuit 400 is then configured, based on the position information from the detection circuit 600 from each of the plurality of optoelectronic detection sub-assemblies 500, to map the locations of the touch.

As illustrated in FIG. 7B, in embodiments of the touch control apparatus where the touch panel 100 contains both the first optical detection layer 40 and the second optical detection layer 70 (as illustrated in FIG. 5A and FIG. 5B), each of the plurality of optoelectronic detection sub-assemblies 500 comprises one of the plurality of first optical detection components 41, a corresponding second optical detection component 71, and a detection circuit 600 that is coupled, and thereby corresponds, to the pair of optical detection components (i.e. the one of the plurality of first optical detection components 41 and the corresponding second optical detection component 71).

As such, in each of the plurality of optoelectronic detection sub-assemblies 500, the detection circuit 600 is configured to simultaneously receive a first electric signal from a corresponding first optical detection component 41 and a second electric signal from a corresponding second optical detection component 71, to determine, based on a change in a difference between the first electrical signal and the second electrical signal (more specifically, based on whether the change in the difference between the first electrical signal and the second electrical signal is larger than or small than a second threshold), whether an external force is applied to a position of the touch panel corresponding to the each of the plurality of optoelectronic detection sub-assemblies 500, and then to output the position information to the central touch control detection circuit 400. The central touch control detection circuit 400 is then configured, based on the position information from the detection circuit 600 from each of the plurality of optoelectronic detection sub-assemblies 500, to map the locations of the touch.

It is noted that regardless of the different embodiments as illustrated in FIG. 7A and FIG. 7B, the plurality of optoelectronic detection sub-assemblies 500 substantially correspond to a plurality of touch control "pixel" units, which can map a touch based on whether an external force can be detected by any optoelectronic detection sub-assembly 500 that corresponds to one particular position of the touch panel 100. It is further noted that there can be a one-to-one corresponding relationship between the plurality of optoelectronic detection sub-assemblies 500 and the plurality of pixel units (i.e. display units), but the plurality of optoelectronic detection sub-assemblies 500 can have a lower number than the plurality of pixel units, but still need to be evenly distributed on the touch control apparatus.

Herein the touch control apparatus can be any electronic products or electronic components that have a liquid crystal display functionality and a touch control functionality, which can be an e-paper (electrical paper), a cellular phone, a tablet, a television, a digital photo frame, a computer monitor, etc.

All references cited in the present disclosure are incorporated by reference in their entirety. Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A touch panel having a plurality of pixel units, comprising:
   a first substrate and a second substrate, opposing to each other;
   a liquid crystal layer, sandwiched between the first substrate and the second substrate and comprising a plurality of liquid crystal molecules; and
   a first optical detection layer, disposed over a light-emitting surface of the liquid crystal layer and comprising a plurality of first optical detection components, each configured to detect, and to convert into a first electric signal, an intensity of a light transmitting through the liquid crystal layer and shedding thereupon; and
   a black matrix, arranged to separate neighboring pixels from one another;
   wherein:
      an orthographic projection of each of the plurality of first optical detection components on the first substrate is contained within an orthographic projection of the black matrix on the first substrate;
   the touch panel further comprising:

a first polarizer over a light-incident surface of the first substrate; and a second polarizer between the liquid crystal layer and the first optical detection layer;

wherein:

a polarization direction of the first polarizer is configured to be substantially parallel or perpendicular to a polarization direction of the second polarizer.

2. The touch panel of claim 1, wherein the liquid crystal layer comprises a plurality of portions positionally corresponding to the plurality of first optical detection components in a one-to-one relationship, and the polarization direction of the first polarizer is configured to be substantially perpendicular to the polarization direction of the second polarizer, wherein:

an orthographic projection of each of the plurality of portions of the liquid crystal layer on the first substrate is overlapped with an orthographic projection of a corresponding first optical detection component; and each of the plurality of portions of the liquid crystal layer comprises liquid crystal molecules having a long axis thereof substantially perpendicular to the first substrate.

3. The touch panel of claim 1, wherein the light comprises an infrared light, and each of the plurality of first optical detection components is configured to detect, and to convert into a first electric signal, an intensity of an infrared light shedding thereupon.

4. The touch panel of claim 3, further comprising a second optical detection layer, disposed over a surface of the liquid crystal layer distal to the light-emitting surface and comprising a plurality of second optical detection components, wherein:

the plurality of second optical detection components are arranged to positionally correspond to the plurality of first optical detection components in a one-to-one relationship;

an orthographic projection of each of the plurality of second optical detection components on the first substrate is contained within the orthographic projection of the black matrix on the first substrate, and is not overlapped with an orthographic projection of a corresponding first optical detection component within a same region of the black matrix; and each of the plurality of second optical detection components is configured to detect, and to convert into a second electric signal, an intensity of an infrared light shedding thereupon.

5. The touch panel of claim 3, wherein the black matrix has an infrared-light-blocking composition, and the first optical detection layer is disposed between the black matrix and the liquid crystal layer.

6. The touch panel of claim 3, wherein the black matrix is configured to block a visible light but to allow an infrared light to pass therethrough.

7. A touch control method utilizing a touch panel according to claim 1, comprising:

detecting a first electric signal from each of the plurality of first optical detection components; and determining whether an external force is applied to a position of the touch panel corresponding to the each of the plurality of first optical detection components based on the first electric signal, and outputting the position if so.

8. The touch control method according to claim 7, wherein the detecting a first electric signal from each of the plurality of first optical detection components comprises:

each of the plurality of first optical detection components detecting, and converting into the first electric signal, an infrared light.

9. The touch control method according to claim 7, wherein the determining whether an external force is applied to a position of the touch panel corresponding to the each of the plurality of first optical detection components based on the first electric signal, and outputting the position if so comprises:

determining that an external force is applied to a position of the touch panel corresponding to the each of the plurality of first optical detection components if a change of the first electric signal is larger than a first threshold value.

10. The touch control method according to claim 7, wherein the touch panel further comprises a second optical detection layer, disposed over a surface of the liquid crystal layer distal to the light-emitting surface and comprising a plurality of second optical detection components, each configured to detect, and to convert into a second electric signal, an intensity of a light shedding thereupon, and is coupled, and corresponds, to one of the plurality of detection circuits, wherein the plurality of second optical detection components are arranged to positionally correspond to the plurality of first optical detection components in a one-to-one relationship, wherein:

the detecting a first electric signal from each of the plurality of first optical detection components comprises:

simultaneously detecting the first electric signal from each of the plurality of first optical detection components and a second electric signal from a corresponding second optical detection component; and the determining whether an external force is applied to a position of the touch panel corresponding to the each of the plurality of first optical detection components based on the first electric signal, and outputting the position if so comprises:

determining that an external force is applied to a position of the touch panel corresponding to the each of the plurality of detection circuits, and outputting the position if a change in a difference between the first electrical signal and the second electrical signal is larger than a second threshold value.

11. A touch panel having a plurality of pixel units, comprising:

a first substrate and a second substrate, opposing to each other;

a liquid crystal layer, sandwiched between the first substrate and the second substrate and comprising a plurality of liquid crystal molecules; and a first optical detection layer, disposed over a light-emitting surface of the liquid crystal layer and comprising a plurality of first optical detection components, each configured to detect, and to convert into a first electric signal, an intensity of a light transmitting through the liquid crystal layer and shedding thereupon; and a black matrix, arranged to separate neighboring pixels from one another;

wherein:

an orthographic projection of each of the plurality of first optical detection components on the first substrate is contained within an orthographic projection of the black matrix on the first substrate;

the touch panel further comprising a second optical detection layer, disposed over a surface of the liquid crystal layer distal to the light-emitting surface and comprising a plurality of second optical detection components, each configured to detect, and to convert into a second electric signal, an intensity of a light shedding thereupon, wherein:
the plurality of second optical detection components are arranged to positionally correspond to the plurality of first optical detection components in a one-to-one relationship; and
an orthographic projection of each of the plurality of second optical detection components on the first substrate is contained within the orthographic projection of the black matrix on the first substrate, and is not overlapped with an orthographic projection of a corresponding first optical detection component within a same region of the black matrix.

12. A touch control apparatus, comprising a touch panel having a plurality of pixel units, comprising:
a first substrate and a second substrate, opposing to each other;
a liquid crystal layer, sandwiched between the first substrate and the second substrate and comprising a plurality of liquid crystal molecules; and
a first optical detection layer, disposed over a light-emitting surface of the liquid crystal layer and comprising a plurality of first optical detection components, each configured to detect, and to convert into a first electric signal, an intensity of a light transmitting through the liquid crystal layer and shedding thereupon; and
a black matrix, arranged to separate neighboring pixels from one another;
wherein:
an orthographic projection of each of the plurality of first optical detection components on the first substrate is contained within an orthographic projection of the black matrix on the first substrate;
the touch control apparatus further comprising a light source configured to provide an infrared light through a light-incident surface of the touch panel;
wherein the light source comprises a light-emitting diode (LED), comprising:
a first composition capable of emitting a visible light; and
a second composition capable of emitting an infrared upon excitement by the visible light.

13. The touch control apparatus of claim 12, further comprising:
a light source configured to emit a visible light; and
an infrared light-emitting layer disposed over a light-incident surface of the second substrate in the touch panel, configured to allow a first portion of the visible light to pass through, and to emit an infrared light upon excitement of a second portion of the visible light shedding thereinto.

14. The touch control apparatus of claim 12, further comprising:
a light source configured to emit a visible light; and
an infrared light-emitting layer disposed over a light-incident surface of the second substrate in the touch panel, comprising a plurality of infrared light-emitting portions, wherein:
each of the plurality of infrared light-emitting portions is arranged to have an orthographic projection thereof on the first substrate overlap with an orthographic projection of a corresponding first optical detection component on the first substrate, and is configured to allow a first portion of the visible light to pass through, and to emit an infrared light upon excitement of a second portion of the visible light shedding thereinto.

15. The touch control apparatus of claim 12, further comprising a plurality of detection circuits, wherein:
each of the plurality of first optical detection components is coupled, and corresponds, to one of the plurality of detection circuits; and
each of the plurality of detection circuits is configured to receive the first electric signal from a corresponding first optical detection component, to determine, based on a change of the first electric signal, whether an external force is applied to a position of the touch panel corresponding to the each of the plurality of detection circuits, and then to output the position if so.

16. The touch control apparatus of claim 15, further comprising a central touch control detection circuit, coupled to each of the plurality of detection circuits and configured to map locations of the touch based on the position received from the each of the plurality of detection circuits.

17. The touch control apparatus of claim 15, wherein:
the touch panel further comprises a second optical detection layer, disposed over a surface of the liquid crystal layer distal to the light-emitting surface and comprising a plurality of second optical detection components, each configured to detect, and to convert into a second electric signal, an intensity of a light shedding thereupon, and is coupled, and corresponds, to one of the plurality of detection circuits, wherein the plurality of second optical detection components are arranged to positionally correspond to the plurality of first optical detection components in a one-to-one relationship; and
each of the plurality of detection circuits is further configured to receive the second electric signal from a corresponding second optical detection component, to determine, based on a change in a difference between the first electrical signal and the second electrical signal, whether an external force is applied to a position of the touch panel corresponding to the each of the plurality of detection circuits, and to output the position if so.

* * * * *